United States Patent
Tong et al.

[11] Patent Number: 5,848,108
[45] Date of Patent: Dec. 8, 1998

[54] SELECTIVE FILTERING FOR CO-CHANNEL INTERFERENCE REDUCTION

[75] Inventors: Wen Tong; Rui Wang, both of Ottawa, Canada

[73] Assignee: Northern Telecom Limited, Montreal, Canada

[21] Appl. No.: 759,092

[22] Filed: Nov. 29, 1996

[51] Int. Cl.⁶ .................................................. H04B 1/10
[52] U.S. Cl. .......................... 375/350; 375/346; 364/574; 370/210
[58] Field of Search ..................... 375/346, 350; 455/296, 63; 370/210; 348/607, 667; 364/574, 572, 724.01, 726

[56] References Cited

U.S. PATENT DOCUMENTS

| | | | |
|---|---|---|---|
| 4,630,304 | 12/1986 | Borth et al. | 381/94 |
| 5,086,340 | 2/1992 | Citta et al. | 358/141 |
| 5,715,282 | 5/1996 | Mansouri et al. | 375/350 |
| 5,727,032 | 10/1995 | Jamal et al. | 375/347 |
| 5,745,187 | 12/1995 | Hulyalkar et al. | 348/607 |
| 5,748,226 | 11/1996 | Limberg | 348/21 |

FOREIGN PATENT DOCUMENTS 0 453 213  10/1991  European Pat. Off. .

*Primary Examiner*—Jason Chan
*Assistant Examiner*—Congvan Tran
*Attorney, Agent, or Firm*—R. John Haley

[57] ABSTRACT

Complex signal samples of an input signal are supplied to via a frequency down-shifter to a digital filter, and to a time-frequency transform unit which produces a plurality of frequency components each associated with a respective frequency band within a bandwidth of the input signal. The frequency component having the maximum momentary energy is determined to determine the down-shifting frequency for the associated frequency band to be filtered, and to determine a complementary up-shifting following the digital filter to produce an output signal. The filter can be a bandpass filter or a bandstop filter, especially for reducing co-channel interference in different types of wireless communications systems.

20 Claims, 3 Drawing Sheets

SELECTIVE FILTERING FOR CO-CHANNEL INTERFERENCE REDUCTION

RELATED APPLICATIONS

The following patent applications, each in the names of Wen Tong et al. and entitled "Co-Channel Interference Reduction", correspond to one another and are referred to below collectively and individually as the co-pending application:

| Country | No | Filed |
| --- | --- | --- |
| United States | 60/004,979 | October 10, 1995 |
| United States | 08/728,368 | October 10, 1996 |
| Canada | 2,187,478 | October 9, 1996 |
| International | PCT/CA96/09672 | October 9, 1996 |

The entire disclosure of each of the United States applications is hereby incorporated herein by reference.

BACKGROUND OF THE INVENTION

Co-channel interference (CCI) is constituted by one or more interfering signals within the frequency band of a desired signal in a communications system, and is a key factor that limits the frequency reuse capacity of mobile radio or wireless communications systems. The CCI can not be reduced by conventional filtering techniques, because it falls within the bandwidth of the desired signal. It has been conventional in communications systems to provide a relatively high ratio of the desired signal strength to the interfering signal strength, generally referred to as the carrier- or signal-to-interference or C/I ratio, in order to maintain effective communications.

The co-pending application by Wen Tong et al. relates to reducing CCI and describes various methods that can be used individually or in combination to achieve significant reduction of CCI. One of these methods comprises selective filtering, in which complex signal samples comprising the desired signal are supplied to a selective filter bank constituted by a plurality of filters having narrow bandwidths which span the total signal bandwidth. The output signal of the filter bank is selected from that filter having the maximum energy in its output at any instant, on the basis that the desired signal is stronger than the CCI and the two signal components generally have different instantaneous frequencies. In order to reduce computation requirements, the complex signal samples are down-converted before, and the selected output signal is up-converted after, the filtering by the filter bank. However, this method still requires considerable computation resources for filtering the entire signal bandwidth to determine the maximum momentary energy of the input signal.

An object of this invention is to provide an improved method of and apparatus for selective filtering of a desired signal for example to reduce CCI.

SUMMARY OF THE INVENTION

One aspect of this invention provides a selective filter comprising: a time-frequency transform unit responsive to samples of an input signal to be filtered for producing a plurality of frequency components of the signal; an identification unit for providing an output identifying a maximum energy one of the frequency components; and a filter for filtering the input signal to produce an output signal, the filter being responsive to the output of the identification unit to provide a pass or stop band, associated with the identified one of the frequency components, within a larger bandwidth of the input signal.

The filter preferably comprises a digital filter to which samples of the input signal are supplied, and desirably the transform unit is responsive to the same number of consecutive samples of the input signal as there are taps of the digital filter.

Preferably the filter comprises a digital filter coupled between a frequency down-shifter and a frequency up-shifter, the frequency down-shifter and frequency up-shifter each being responsive to the output of the identification unit to shift the frequency of the signal being filtered by a respective frequency associated with said output of the identification unit. Conveniently the samples of the input signal comprise complex signal samples and each of the frequency down-shifter and the frequency up-shifter comprises a complex signal multiplier.

In different applications of the invention the digital filter can comprise a bandstop filter or a bandpass filter.

According to another aspect, this invention provides a selective filter comprising: a transform unit responsive to complex signal samples of an input signal to be filtered for producing a plurality of frequency components of the signal, each of said frequency components being associated with a respective one of a like plurality of frequency bands within a bandwidth of the input signal; a maximum energy determination unit responsive to the plurality of frequency components for determining which of said frequency components has a greatest momentary energy; and a digital filter for filtering the complex signal samples of the input signal with a filter pass or stop band corresponding to the frequency band associated with the frequency component determined by the maximum energy determination unit to have the greatest momentary energy.

In this case the digital filter preferably comprises a complex signal multiplier arranged to multiply complex signal samples of the input signal by complex signal samples of a respective predetermined frequency representing said frequency band, associated with the frequency component determined by the maximum energy determination unit to have the greatest momentary energy, and a digital filter supplied with an output from the complex signal multiplier and having real filter coefficients.

The invention also provides a method of selectively filtering an input signal, comprising the steps of: performing a time-frequency transform of complex signal samples representing the input signal to produce a plurality of frequency components; determining which of the plurality of frequency components has the greatest momentary energy; and filtering the input signal using a respective one of a plurality of filter pass or stop bands within the bandwidth of the input signal and selected in accordance with the determination of which of the plurality of frequency components has the greatest momentary energy.

Advantageously the step of filtering the input signal comprises frequency-shifting the input signal, by a frequency dependent upon said determination, to a predetermined center frequency, and filtering the frequency-shifted signal at said predetermined center frequency. Preferably the predetermined center frequency is zero and the filtering comprises digital filtering using real filter coefficients.

Another aspect of the invention provides a method of reducing co-channel interference with a desired signal in a predetermined signal bandwidth of a received signal in a communications system, comprising selectively filtering the received signal by the method recited above, the received signal constituting said input signal and the step of filtering comprising bandpass filtering.

A further aspect of this invention provides a method of reducing interference with a desired signal in a spread spectrum communications system, the interference having a greater amplitude and smaller bandwidth than the desired signal, comprising selectively filtering a received signal by the method recited above, the received signal constituting said input signal and the step of filtering comprising bandstop filtering.

BRIEF DESCRIPTION OF THE DRAWINGS

The invention will be further understood from the following description with reference to the accompanying drawings, in which.

DETAILED DESCRIPTION

Figure 1:
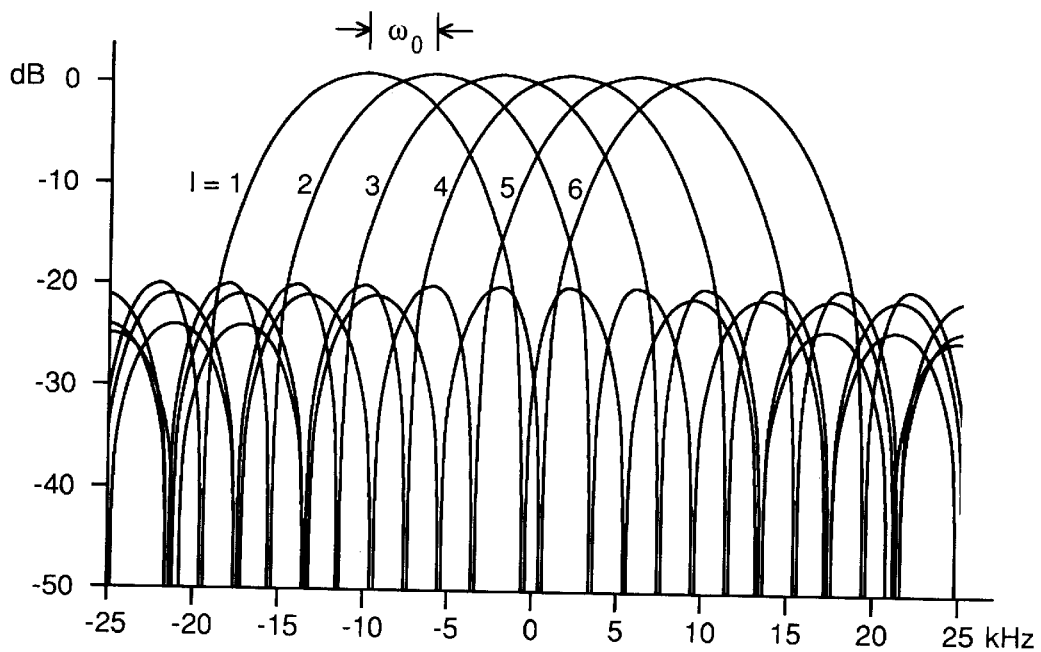
FIG. 1 illustrates characteristics of a selective filter bank.

In a wireless communications receiver, a communications signal, for example an AMPS (Advanced Mobile Phone Service) or GSM (Global System for Mobile Communications) signal using frequency modulation (FM), is typically supplied via an RF (radio frequency) circuit and a down converter to a sampler which produces signal samples which are converted into digital form by an A-D (analog-to-digital) converter. The digital complex signal samples can, for example as described in the co-pending application by Wen Tong et al., be digitally processed to reduce co-channel interference (CCI) signals which are within the bandwidth of the desired signal. Where the system is a cellular radio communications system, the CCI may for example be due to frequency reuse in other cells of the system, and/or it may originate from sources external to the communications system. As is well known, the digital signal samples are preferably processed in one or more DSP (digital signal processor) integrated circuits, which are desirably also used for processing the signals to reduce the CCI.

As described in the co-pending application, one of the processes that can be used to reduce the CCI is selective filtering, in which the complex signal samples are filtered by a plurality of narrow bandwidth short impulse response (which are contradictory requirements) filters spanning the signal bandwidth. The output signal of the filter bank is selected from that filter having the maximum energy in its output at any instant, on the basis that the desired signal is stronger than the CCI and the two signal components generally have different instantaneous frequencies. The plurality of narrow bandwidth filters constitute a selective filter bank which can be conveniently implemented by a single digital filter unit preceded and followed by frequency converters.

The operation and effectiveness of the selective filtering depends on the number of filter bands and the filter characteristics. In particular, there are contradictory desires for a large number of narrow filter bands for selectivity, a small number of filter bands to reduce processing requirements, a sufficient bandwidth to be responsive to the variation speed of the instantaneous frequency of the desired signal, a minimum length impulse response for time resolution, and a combined flat and linear phase response.

An advantageous compromise among these desires is adopted in the embodiment of the invention described below, which is for example for an AMPS system and uses six FIR (finite impulse response) filter bands with a filter design based on the prolate spheroidal function to provide a minimal product of the filter bandwidth and impulse response duration. The selectively filtered output is constituted by the output from that filter band which has the greatest momentary energy output, this varying over time across the signal bandwidth in a manner which is generally different from and independent of the weaker CCI. Outputs from more than one, but less than all, of the filter bands could alternatively be combined to provide an output signal, but this would result in a more complicated arrangement. Obviously other numbers and characteristics of the filter bands can be used if desired.

FIG. 1 illustrates a frequency response of the selective filter bank, showing the overlapping primary lobes of the six filter bands, identified by an index 1 from 1 to 6, spanning the bandwidth of a desired signal. The total signal bandwidth as represented in FIG. 1 is centered at 0 kHz, with adjacent ones of the six filter bands having center frequency spacings of $\omega_0$ as illustrated. All of the six filter bands can be provided by a single digital filter in a DSP by frequency conversion by the offset of the center frequency of each filter band from 0 kHz, i.e. by multiplying the input complex signal samples to be filtered by respective carrier frequency samples $e^{jL\omega_0(k)}$, where $L=1-7/2$ and k denotes the respective samples. Each carrier frequency sample $e^{jL\omega_0(k)}$ can conveniently be produced by a complex signal multiplier having one input supplied with a carrier signal and the other input supplied from its output via a delay element of one sampling period, for example in accordance with the equation $e^{jL\omega_0(k)}=e^{jL\omega_0(k-1)}e^{j\omega_0}$. Conversely, the selected filter output is up-converted by the respective frequency offset.

As indicated above, the filtering in each filter band is desired to provide both a narrow bandwidth and a short impulse response. These contradictory desires are resolved by using a prolate spheroidal wave function based FIR filter design technique. Prolate spheroidal functions are a set of eigen functions which satisfy the integral equation:

$$\int_{-B/2}^{B/2} \frac{\sin(\pi T_w(f-\eta))}{\pi(f-\eta)} S_n(\eta)d\eta = \lambda_n S_n(f) \; n = 0, 1, 2, 3, \ldots$$

where $\eta$ is the integral variable, B is the filter bandwidth, f denotes frequency, $T_w$ is the sampling interval, $S_n$ is an eigen function constituting the frequency response of the filter, and $\lambda_n$ is the eigen value for different solutions identified by n.

The left-hand side of the above integral equation means that a signal is truncated by a time window, and the right-hand side is the product of the original signal and an eigen value. The signal with the largest eigen value $\lambda_n$ contains the most energy after the truncation.

In order to minimize both (e.g. the product of) the filter bandwidth and the impulse response duration, the digital filter is designed as a band limited filter using the truncated prolate spheroidal function. The truncating time window causes the filter to be no longer band limited, and there are two types of errors introduced, namely an in-band truncation error and an aliasing error. A filter impulse response is desired which minimizes both of these errors, and this is done by solving the above integral equation and selecting the eigen function $S_n$ which has the largest eigen value $\lambda_n$. The tap coefficients of the filter are the samples of an angular prolate spheroidal function.

A closed form solution of the angular prolate spheroidal function is very difficult to obtain; a numerical solution can be used as described by Rui Wang in "Asynchronous Sampling Data Receiver", Ph.D. Dissertation, University of Toronto, Canada, October 1986 to provide the filter response shown in FIG. 1 with the coefficients detailed below. The frequency shifting by equally spaced carrier frequencies as described above, so that all of the filter bands can be implemented by a single digital filter, also reduces processing requirements because the filter coefficients are real rather than complex numbers. In addition, the filter is designed as a symmetrical FIR filter in order to halve the number of multiplications required. The resulting filter design is shown in FIG. 2.

Figure 2:
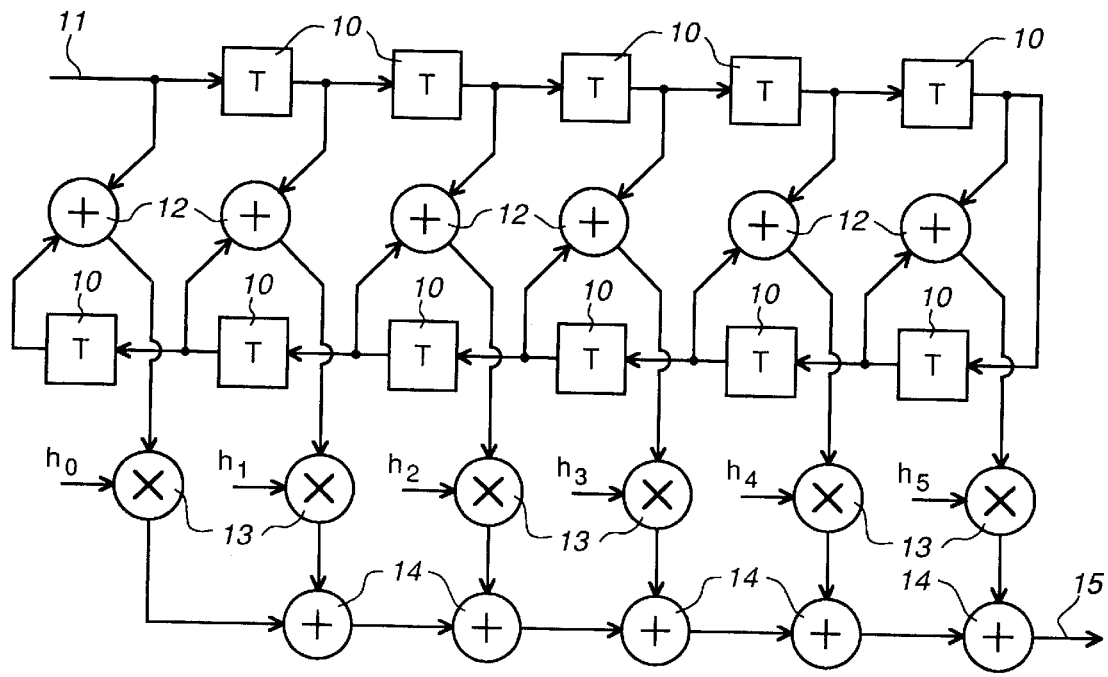
FIG. 2 schematically illustrates a digital filter for providing filter characteristics in accordance with the illustration of FIG. 1.

Referring to FIG. 2, the digital filter is a 12 tap digital filter comprising a delay line of eleven complex signal delay elements 10 each providing a delay of one sampling period T, via which the complex input signal on a line 11 is passed. Six complex signal adders 12 sum the complex signals at symmetrical points along the delay line, i.e. from the line 11 and the output of the eleventh delay element, and from the outputs of the first and tenth, second and ninth, third and eighth, fourth and seventh, and fifth and sixth delay elements 10 respectively. The resulting complex signal sums are multiplied by real coefficients $h_0$ to $h_5$ respectively in six complex-real multipliers 13, the complex signal outputs of which are summed in another five complex signal adders 14 to provide a complex signal output on a line 15. As described above, the coefficients $h_0$ to $h_5$ are numerically determined to have the values in the following table:

| $h_0$ | $h_1$ | $h_2$ | $h_3$ | $h_4$ | $h_5$ |
| --- | --- | --- | --- | --- | --- |
| 0.0510 | 0.0595 | 0.0728 | 0.0888 | 0.1033 | 0.1120 |

In the selective filter described in the co-pending application, the six complex signal outputs from the filter bands are supplied to respective energy calculator units, and a maximum energy selector determines the index 1 of the filter band having the maximum momentary energy output, the output of this filter band then being selected as the output of the selective filter. As explained above, this is effective but has the disadvantage that the filtering is performed for each sample for all of the frequency bands, which requires substantial computational resources.

This disadvantage, which becomes even more significant with more filter bands, is reduced or avoided by selective filtering in accordance with embodiments of the invention, an example of which is described below with reference to FIG. 3. Generally, a selective filter in accordance with embodiments of the invention comprises two paths, one of which provides the selective filtering function and the other of which performs a time-frequency transform and determines the momentary energy of transformed frequency components to control the selective filtering function.

Figure 3:
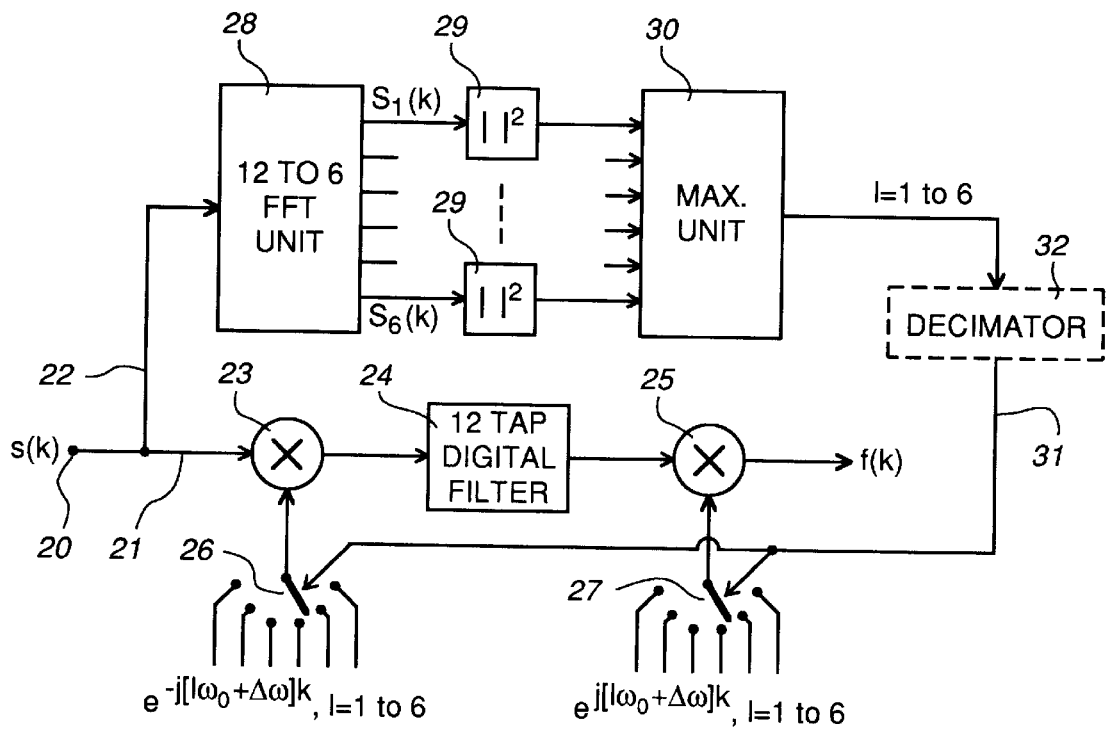
FIG. 3 schematically illustrates a block diagram of a selective filter in accordance with an embodiment of this invention.

Referring to FIG. 3, input complex signal samples s(k) to be selectively filtered are supplied from an input terminal 20 to the first path via a line 21 and to the second path via a line 22. The first path comprises a frequency down-converter constituted by a complex signal multiplier 23, a 12 tap digital filter 24 which is as described above with reference to FIG. 2, and a frequency up-converter constituted by a complex signal multiplier 25. Each input sample on the line 21 is down-shifted by the complex signal multiplier 23 multiplying it by a sample of one of 6 carrier frequencies selected by a switch 26 as described below, the output of the multiplier 23 is filtered by the digital filter 24, and the filtered sample is up-shifted by the complex signal multiplier 25 multiplying it by a sample of one of 6 carrier frequencies selected by a switch 27 as described below. The number of 6 carrier frequencies corresponds to the number of filter bands. The output of the multiplier 25 comprises complex signal samples f(k) which constitute the output of the selective filter.

The input complex signal samples are also supplied via the line 22 to an FFT (Fast Foulier Transform) unit 28, which provides a transform of the complex signal samples from 12 consecutive samples in the time domain, corresponding to the 12 taps of the digital filter 24, to 6 complex signal components $S_1(k)$ to $S_6(k)$ in the frequency domain, corresponding to the 6 filter bands. The frequency components $S_1(k)$ to $S_6(k)$ are supplied to respective energy calculator units 29. Each unit 29 for example comprises a function for producing the complex conjugate of the supplied signal and a complex signal multiplier arranged to multiply the supplied signal by this complex conjugate to produce an output signal representing the energy of the supplied signal. The output signals from the units 29 are supplied to inputs of a maximum energy selector unit 30, which determines the index 1 of the signal having the maximum energy output. This index 1, having a value from 1 to 6 corresponding to the 6 filter bands, is supplied via a line 31 as a control signal to the switches 26 and 27. In order to reduce processing requirements, and in view of a relatively slow rate of change of the selection index 1 compared with the sampling rate, the line 31 can optionally include a decimator 32 as shown in dashed lines, the decimator 32 for example having a decimation factor of 2 so that alternate determinations of the selection index 1 are ignored for controlling the switches 26 and 27.

As shown in FIG. 3 and as can be seen from the illustration of the frequency bands in FIG. 1, the carrier frequencies by which the complex signal samples are down- and up-shifted are constituted by complex signal samples $e^{\pm j[l\omega_0 + \Delta\omega]k}$, where 1=1 to 6 and is determined for different input samples in accordance with the selection index 1 on the line 31 controlling the switches 26 and 27, and $\Delta\omega$ is a frequency offset common to all of the frequency bands and equal to half the total signal bandwidth, so that the digital filter 24 can operate at a center frequency of zero for whichever frequency band is selected at any instant.

Figure 4:
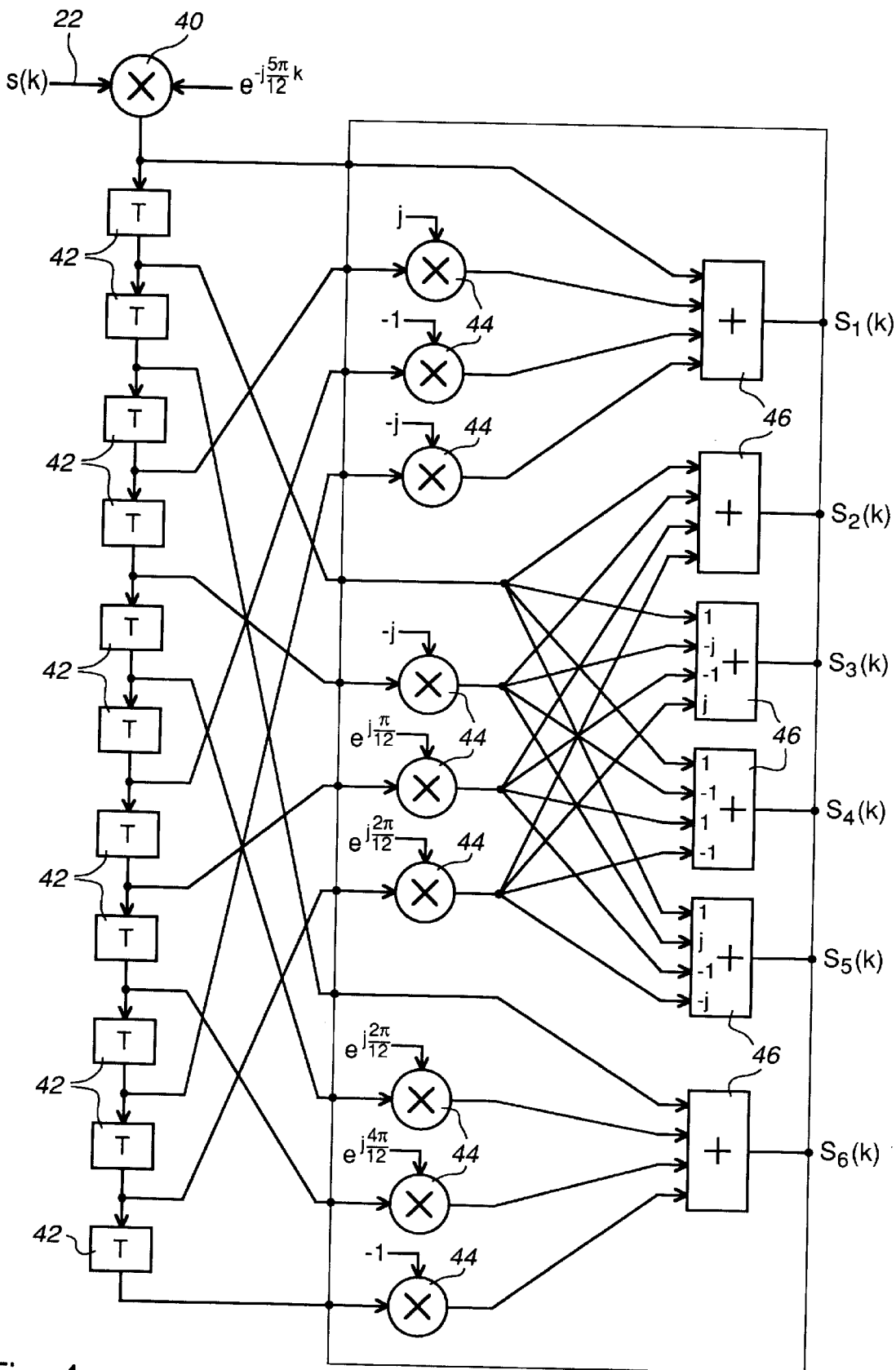
FIG. 4 schematically illustrates a transform unit of the selective filter.

FIG. 4 illustrates by way of example one form of the FFT unit 28. The input complex signal samples s(k) on the line 22 are down-shifted to a center frequency of zero by multiplication in a complex signal multiplier 40 by samples of a carrier frequency. The samples output from the multiplier 40 are supplied to a delay line comprising 11 complex signal delay elements 42 each providing a delay of one sampling period T, to produce 12 consecutively delayed samples $s_0$ to $s_{11}$. These are supplied in blocks of four to a transform function unit comprising 9 complex signal multipliers 44 and 6 complex signal adders 46 which produce the frequency components $S_1(k)$ to $S_6(k)$ at their outputs. Thus the sample $s_0$ is supplied to one input, and the samples $s_3$, $s_6$, and $s_9$ are supplied via respective ones of the multipliers 44, having the multiplication numbers as shown, to the other inputs, of one of the adders 46 which produces the frequency component $S_1(k)$. Similarly the sample $s_2$ is supplied to one input, and the samples $s_5$, $s_8$, and $s_{11}$ are supplied via respective ones of the multipliers 44, having the multiplication numbers as shown, to the other inputs, of another of the adders 46 which produces the frequency component $S_6(k)$. In addition, the sample $s_1$, is supplied to one input, and the samples $s_4$, $s_7$, and $s_{10}$ are supplied via respective ones of the multipliers 44, having the multiplication numbers as shown, to the other inputs, of the other four adders 46, with modifications of their inputs as shown by multipliers at these inputs of the adders, which produce the other four frequency components $S_2(k)$ to $S_5(k)$.

As can be appreciated from the above description, the FFT unit 28 serves to produce in a rapid and relatively computationally simple manner frequency components corresponding to the filter bands of the selective filter. This is not sufficiently accurate to meet the requirements of the selective filter itself, but is sufficient to enable the units 29 and 30 to determine the index 1 of the filter band having the greatest momentary energy. This index is then used to control the switches 26 and 27 to select, for each input sample for filtering by the digital filter 24, the appropriate carrier frequency for down- and up-shifting, so that the digital filter 24 is used for accurately filtering of the input samples for only the one selected filter band at any instant. The selective filter of FIG. 3 therefore substantially reduces the computational requirements for accurate filtering in accordance with the filter bands as shown in FIG. 1.

Although as described above the unit 28 performs an FFT, it can be appreciated that alternatively other transforms, for example a Hartley Transform or a Cosine Transform, from the time domain of the input signal samples to the frequency domain corresponding to the filter bands can be performed.

As described above, the transform function operates on 12 consecutive samples consistent with the 12 taps of the digital filter 24; this is desired for accurate selective filtering in the embodiment of the invention described above. However, this is not essential and the transform function may instead operate on a number of samples that is different from the number of taps of the digital filter, especially where accurate filtering is not required.

For example, the embodiment of the invention described above relates to selective filtering of an AMPS signal to reduce co-channel interference, and the selective filter accordingly provides a pass band that is selected from the larger bandwidth of the AMPS channel. Conversely, the invention is also applicable to reducing interference with a wideband signal, such as a spread spectrum signal for example using CDMA (code division multiple access), due to a relatively strong interfering signal (which may for example comprise an AMPS signal) at frequencies occupying only a part of the spread spectrum.

In this case, it can be appreciated that the second path including a time-frequency transform function can be used in a similar manner to that described above to detect that the relatively large energy of the interfering signal occurs in one of a plurality of frequency bands within the much wider frequency band of the spread spectrum. There may be a relatively large number, for example 41, of such frequency bands. The digital filter in the first path in this case can be a band-stop filter, which is controlled by the output of the first path to attenuate signals within the selected band, thereby attenuating the strong interfering signal. In this case there is not a requirement for particularly accurate filtering, so that there need not necessarily be any correlation between the number of taps of the digital filter and the number of samples operated upon by the transform function. The same principles can be applied to attenuate simultaneously more than one interfering signal.

Likewise, although in the embodiment of the invention described in detail above only one of the 6 frequency bands is selected to be passed by the selective filter, it can be appreciated that the same principles may be applied for selecting more than one, but less than all, of the frequency bands at any instant, and the outputs of the selected frequency bands can be combined, with or without weighting as desired, to produce the output signal samples from the selective filter.

Figure 5:
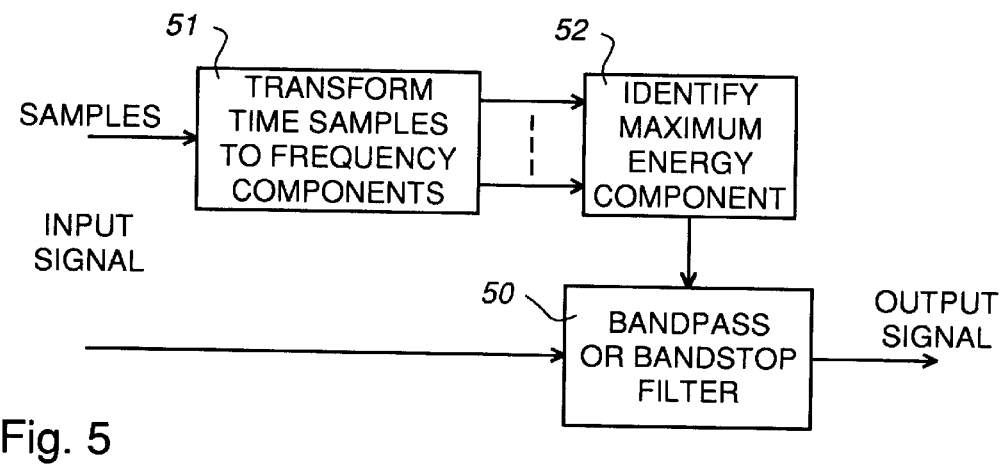
FIG. 5 which appears on the same sheet as FIG. 3, illustrates a general form of a selective filter in accordance with the invention.

Accordingly, a general form of a selective filter in accordance with the invention is illustrated in FIG. 5. As shown in FIG. 5, an input signal to be filtered is supplied to a filter 50 whose output constitutes an output signal. Samples of the input signal are also supplied to a transform unit 51 which produces a plurality of frequency components, and a subsequent unit 52 identifies at least one of these frequency components having a maximum energy and controls the filter 50 accordingly. The filter 50 is conveniently a digital filter, in which case the same input signal samples that are supplied to the transform unit 51 can also be supplied to the filter 50 (i.e. the two input signal paths in FIG. 5 can be interconnected as are the lines 21 and 22 as described above), but this need not necessarily be the case. The filter 50 can be a bandpass filter for example as described above for an AMPS system, or it can be a bandstop filter for example as described above for a spread spectrum system, with the maximum energy component(s) identified by the unit 52 determining the pass or stop band(s), respectively, of the filter within a larger total bandwidth of the signal.

Thus it can be appreciated that these and numerous other changes, variations, and adaptations may be made to the particular embodiments of the invention described above, without departing from the scope of the claims.

What is claimed is:

1. A selective filter comprising:
    a time-frequency transform unit responsive to samples of an input signal to be filtered for producing a plurality of frequency components of the signal;
    an identification unit for providing an output identifying a maximum energy one of the frequency components; and
    a filter for filtering the input signal to produce an output signal, the filter being responsive to the output of the identification unit to provide a pass or stop band, associated with the identified one of the frequency components, within a larger bandwidth of the input signal.

2. A selective filter as claimed in claim 1 wherein the filter comprises a digital filter to which samples of the input signal are supplied.

3. A selective filter as claimed in claim 2 wherein the digital filter comprises a bandstop filter.

4. A selective filter as claimed in claim 2 wherein the transform unit is responsive to the same number of consecutive samples of the input signal as there are taps of the digital filter.

5. A selective filter as claimed in claim 1 wherein the filter comprises a digital filter coupled between a frequency down-shifter and a frequency up-shifter, the frequency down-shifter and frequency up-shifter each being responsive to the output of the identification unit to shift the frequency of the signal being filtered by a respective frequency associated with said output of the identification unit.

6. A selective filter as claimed in claim 5 wherein the samples of the input signal comprise complex signal samples and each of the frequency down-shifter and the frequency up-shifter comprises a complex signal multiplier.

7. A selective filter as claimed in claim 6 wherein the digital filter comprises a bandstop filter.

8. A selective filter as claimed in claim 6 wherein the transform unit is responsive to the same number of consecutive samples of the input signal as there are taps of the digital filter.

9. A selective filter as claimed in claim 8 wherein the digital filter provides a pass band in accordance with an angular prolate spheroidal function.

10. A selective filter as claimed in claim 6 wherein the transform unit is arranged to perform a Fast Fourier Transform of samples of the input signal.

11. A selective filter as claimed in claim 1 wherein the transform unit is arranged to perform a Fast Fourier Transform of samples of the input signal.

12. A selective filter comprising:
   a transform unit responsive to complex signal samples of an input signal to be filtered for producing a plurality of frequency components of the signal, each of said frequency components being associated with a respective one of a like plurality of frequency bands within a bandwidth of the input signal;
   a maximum energy determination unit responsive to the plurality of frequency components for determining which of said frequency components has a greatest momentary energy; and
   a digital filter for filtering the complex signal samples of the input signal with a filter pass or stop band corresponding to the frequency band associated with the frequency component determined by the maximum energy determination unit to have the greatest momentary energy.

13. A selective filter as claimed in claim 12 wherein the transform unit is responsive to the same number of complex signal samples as the digital filter has taps.

14. A selective filter as claimed in claim 12 wherein the digital filter comprises a complex signal multiplier arranged to multiply complex signal samples of the input signal by complex signal samples of a respective predetermined frequency representing said frequency band, associated with the frequency component determined by the maximum energy determination unit to have the greatest momentary energy, and a digital filter supplied with an output from the complex signal multiplier and having real filter coefficients.

15. A method of selectively filtering an input signal, comprising the steps of:
   performing a time-frequency transform of complex signal samples representing the input signal to produce a plurality of frequency components;
   determining which of the plurality of frequency components has the greatest momentary energy; and
   filtering the input signal using a respective one of a plurality of filter pass or stop bands within the bandwidth of the input signal and selected in accordance with the determination of which of the plurality of frequency components has the greatest momentary energy.

16. A method as claimed in claim 15 wherein the step of filtering the input signal comprises frequency-shifting the input signal, by a frequency dependent upon said determination, to a predetermined center frequency, and filtering the frequency-shifted signal at said predetermined center frequency.

17. A method as claimed in claim 16 wherein the predetermined center frequency is zero and the filtering comprises digital filtering using real filter coefficients.

18. A method as claimed in claim 15 wherein the step of filtering comprises digital filtering and the time-frequency transform is performed on the same number of consecutive complex signal samples of the input signal as there are taps of the digital filter.

19. A method of reducing co-channel interference with a desired signal in a predetermined signal bandwidth of a received signal in a communications system, comprising selectively filtering the received signal by the method of claim 15, the received signal constituting said input signal and the step of filtering comprising bandpass filtering.

20. A method of reducing interference with a desired signal in a spread spectrum communications system, the interference having a greater amplitude and smaller bandwidth than the desired signal, comprising selectively filtering a received signal by the method of claim 15, the received signal constituting said input signal and the step of filtering comprising bandstop filtering.

* * * * *